United States Patent [19]
Lytwynec et al.

[11] Patent Number: 6,000,853
[45] Date of Patent: Dec. 14, 1999

[54] MULTI-LAYER ENGINE BEARINGS AND METHOD OF MANUFACTURE

[75] Inventors: Michael D. Lytwynec, Milford; James R. Toth, Ann Arbor; Daniel E. Dugan, Rochester, all of Mich.

[73] Assignee: Federal-Mogul World Wide, Inc., Southfield, Mich.

[21] Appl. No.: 09/070,961

[22] Filed: May 1, 1998

[51] Int. Cl.⁶ .................................................. F16C 17/02
[52] U.S. Cl. ............................................................ 384/294
[58] Field of Search ................................... 384/294, 276, 384/278, 279, 280, 288

[56] References Cited

U.S. PATENT DOCUMENTS

| | | | |
|---|---|---|---|
| 3,077,285 | 2/1963 | Budininkas | 220/64 |
| 3,215,513 | 11/1965 | Schaefer | 29/194 |
| 3,522,974 | 8/1970 | Polti . | |
| 3,623,205 | 11/1971 | Scott | 29/196 |
| 4,474,861 | 10/1984 | Ecer | 428/614 |
| 4,553,856 | 11/1985 | Bierlein | 384/276 |
| 4,836,695 | 6/1989 | Baureis | 384/276 |
| 4,889,435 | 12/1989 | Gojon | 384/276 |
| 4,999,257 | 3/1991 | Imai | 428/555 |
| 5,056,936 | 10/1991 | Mahrus | 384/276 |
| 5,056,937 | 10/1991 | Tanaka | 384/278 |
| 5,185,216 | 2/1993 | Tanaka | 428/614 |
| 5,209,578 | 5/1993 | Eastham | 384/276 |
| 5,434,012 | 7/1995 | Tanaka | 428/643 |
| 5,489,487 | 2/1996 | Tanaka | 428/548 |
| 5,601,371 | 2/1997 | Koroschetz | 384/276 |
| 5,665,480 | 9/1997 | Tanaka | 428/645 |

*Primary Examiner*—Lenard A. Footland
*Attorney, Agent, or Firm*—Reising, Ethington, Barnes, Kisselle, Learman & McCulloch, P.C.

[57] ABSTRACT

A multilayer engine bearing (26) includes a steel backing (36) having a liner (38) of bearing metal of either copper-lead or aluminum alloys formed on the backing (36) and a thin layer (44) of either copper or nickel plated on the liner (38) to define a base lining member (40) of the bearing (26). A multilayer overplate (46) is formed on the base lining member (40) and includes an underlayer (48) of a lead-tin-copper alloy having a thickness of about 10 $\mu$m and an overlayer (50) of tin having a thickness of about 5 $\mu$m. The multilayer overplate (46) exhibits exceptional fatigue resistance under high dynamic loading conditions and retains good conformability and embedibility characteristics.

12 Claims, 2 Drawing Sheets

MULTI-LAYER ENGINE BEARINGS AND METHOD OF MANUFACTURE

BACKGROUND OF THE INVENTION

1. Technical Field

The present invention relates generally to plain bearings and to their method of manufacture and more particularly to multilayer engine bearings of the type having a metal backed layer of copper-lead or aluminum alloy lining overplated with a softer bearing metal for use in internal combustion engines.

2. Related Prior Art

Plain engine journal bearings for use in high load engine applications, such as connecting rod, main and accessory or balance crankshaft bearings of high torque diesel or high performance gasoline engines, typically include a base lining member having a lining of either copper-lead or aluminum alloy formed on a surface of a steel backing. The lining is overplated with a softer bearing metal typically comprising a single layer of a lead-tin-copper alloy having a thickness of about 25 $\mu$m. Often, a nickel diffusion barrier or copper bonding layer is interposed between the lining and overplate. As a final step, the bearing is typically coated with a micro-thin layer of tin or lead-tin flash plating having a thickness of about 1 $\mu$m or less. The flash plating is primarily cosmetic, giving the product a bright, pleasing appearance. It also provides a level of corrosion protection to the steel backing. The micro-thin flash plating applied to the overplate quickly dissipates within the first few hours of engine break-in, and as such does not contribute to the bearing properties of the overplate.

In service, such multilayer crankshaft bearings are subjected to dynamic loads that vary in magnitude and direction due to the inertial loads applied by the piston and connecting rod mechanism and by the cylinder gas. The softer overplate layer enables the bearing surface to continually change and conform under high load forces to any misalignments or changes in profile or loading of the member being journaled, so that the loads are distributed across a greater surface area of the bearing. This property is generally known as "conformability". The overplate also allows any foreign particles of dirt or metal that may come between the bearing surface and the member it journals to become embedded or absorbed into the bearing surface, so as to protect the bearing and journal from excessive wear or damage. This property is known as "embedibility".

It is generally accepted that conformability and embedibility are dependent upon overplate thickess, with a thicker overplate being preferred. It is also generally known that as the thickness of the overplate increases, so does the susceptibility to bearing fatigue (i.e., the fracturing of the bearing surface when under load). Resistance to fatigue cracking requires that the bearing surface exhibit sufficient tensile strength to enable it to undergo minor configuration changes without cracking. Thus, it is necessary to balance the competing properties of conformability/embedibility and fatigue resistance when designing an engine bearing, particularly one that is to be subjected to high dynamic loading.

For many high load engine applications, it has been found that the single layer, 25 $\mu$m thick lead-tin-copper overplate described above provides excellent conformability and embedibility characteristics and good fatigue resistance. However, as the output and efficiency of engines continually increases, the dynamic loads placed on the crankshaft bearings also increase, as does the potential for bearing fatigue. It has been found that under extreme loading conditions the conventional bearings described above having a single layer overplate of lead-tin-copper are prone to fatigue. Efforts to alleviate fatigue by simply decreasing the thickness of the lead-tin-copper overplate layer to less than the 25 $\mu$m thickness while at the same time preserving an acceptable level of conformability and embedibility have been largely unsuccessful to date.

Thus, there exists a need in the industry for an improved journal bearing that can perform under such extreme high dynamic loading conditions without experiencing fatigue and while maintaining good conformability and embedibility characteristics.

SUMMARY OF THE INVENTION

According to the invention, a multilayer engine bearing is provided comprising a base lining member having a rigid metal backing and a lining of bearing metal formed on the backing, and is characterized by a multilayer overplate formed on the base lining member including an underlayer of lead-tin-copper alloy having a predetermined thickness of about 10 $\mu$m and a functional overlayer of tin having a predetermined thickness of about 5 $\mu$m.

Such a bearing is able to withstand extreme high dynamic loading conditions without fatigue and while providing good conformability and embedibility characteristics. In comparative testing under extreme high dynamic loading conditions, bearings according to the invention having the characteristic multilayer overplate exhibited no observable signs of fatigue cracking, whereas conventional bearings formed with the traditional 25 $\mu$m single layer lead-tin-copper overplate exhibited extensive fatigue cracking.

Unlike the microthin tin flash plating employed in traditional engine bearings, the tin overlayer of the invention is purposely thicker so that it remains in place over the lead-tin-copper underlayer when in service so as to contribute to the bearing properties of the overplate. The properties of underlayer and overlayer compliment one another in a way that, when combined, provides the desired fatigue-free bearing surface characteristics under extreme high dynamic loading conditions, while preserving conformability and embedibility.

A method is also provided for fabricating a multilayer engine bearing according to the invention and comprises the steps of preparing a base lining member by forming a lining of bearing metal on a rigid backing, and is characterized by forming a multilayer overplate on the base lining member including forming an underlayer of lead-tin-copper alloy having a predetermined thickness of about 10 $\mu$m and an overlayer of tin having a predetermined thickness of about 5 $\mu$m. These aspects of the invention share the same advantages over the known prior art as those discussed above.

BRIEF DESCRIPTION OF THE DRAWINGS

These and other advantages and features will be readily appreciated as the same becomes better understood by reference to the following detailed description when considered in connection with the accompanying drawings, wherein.

DETAILED DESCRIPTION OF THE PREFERRED EMBODIMENTS

Figure 1:
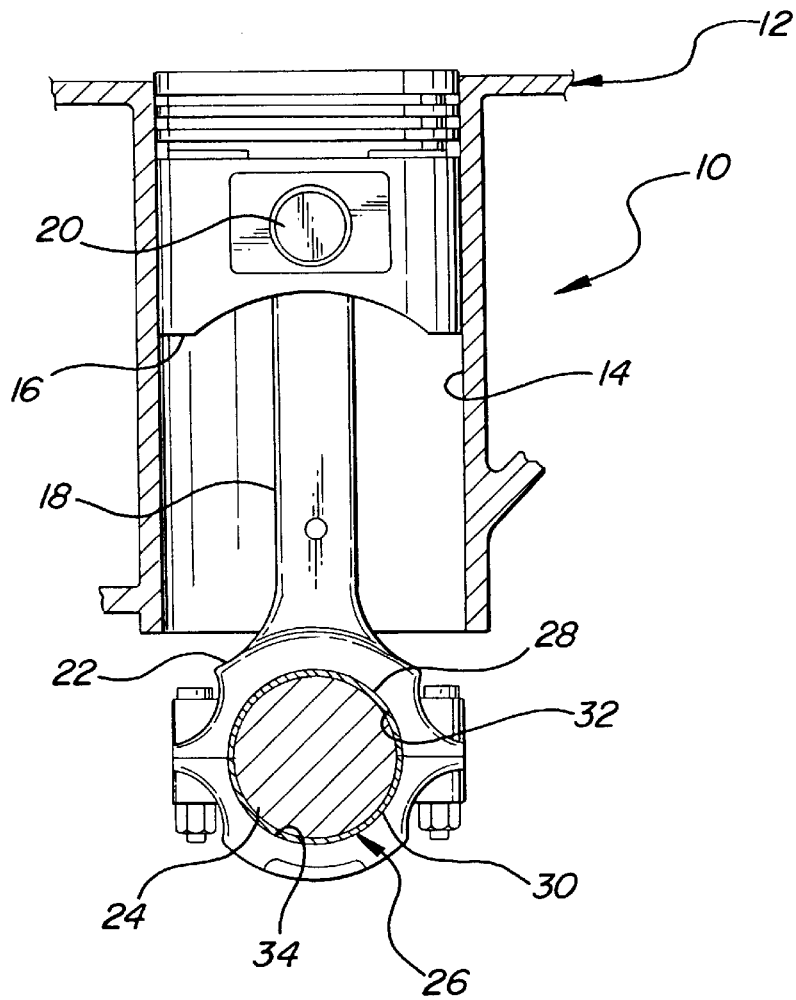
FIG. 1 is a fragmentary sectional view of an internal combustion engine having a rotatable member shown journaled by a bearing constructed in accordance with a presently preferred embodiment of the invention.

Turning now in more detail to the drawings, FIG. 1 schematically illustrates an internal combustion engine, generally shown at 10, having an engine block 12 formed with a plurality of piston cylinders 14 (only one shown) in which pistons 16 reciprocate. Each piston 16 is coupled to an upper end of an associated connecting rod 18 by a wrist pin 20. Each connecting rod 18, in turn, is drivingly coupled at an opposite lower end 22 thereof to a crankshaft 24. A multilayer plain bearing 26 constructed according to the invention is disposed between each connecting rod 18 and the crankshaft 24 to establish journaled connections between the connecting rods 18 and crankshaft 24.

Each bearing 26 includes an upper half 28 and a lower half 30 adapted for mounting in respective upper and lower bearing seats 32, 34 of the connecting rod 18 in conventional manner to collectively encircle the crankshaft 24. Multilayer bearings 26 of the same type (i.e., the main bearings, not shown) may also be disposed in the usual manner in the block 12 adjacent the ends of the crankshaft 24, and in many engine applications at spaced points along the length of the crankshaft 24 between adjacent cylinders 14 as well to provide journalled support to the crankshaft 24 for rotation about its axis relative to the block 12. For purposes of the invention, such multilayer bearings 26 may be generally referred to as journal bearings or sleeve bearings, and in the illustrated example crankshaft bearings, and include connecting rod bearings, main bearings as well as other high dynamic loading applications where a plain multilayer bearing is employed to journal a rotatable component of a working system. The term multilayer bearing also is understood to include within its scope multilayer bushings.

Figure 2:
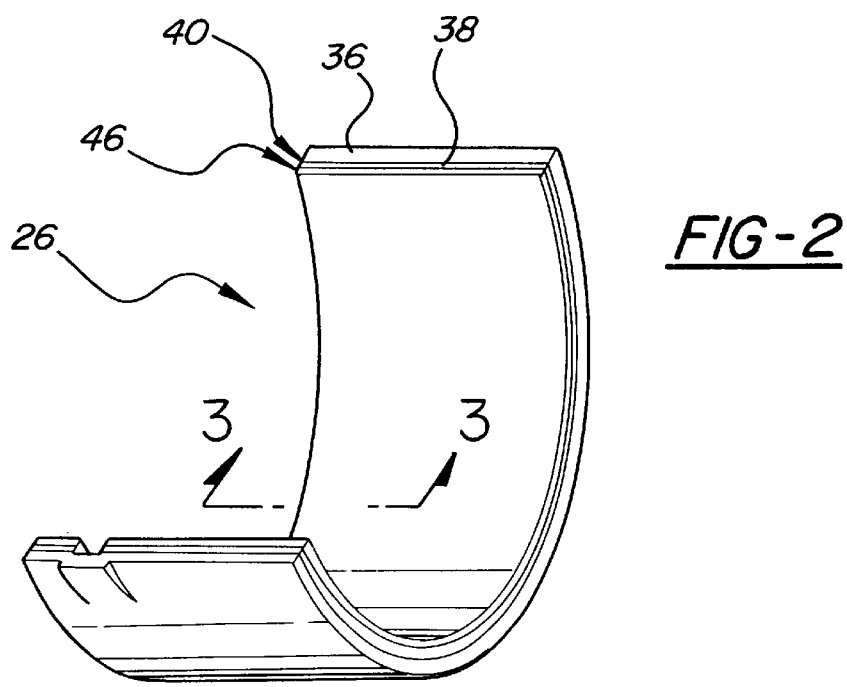
FIG. 2 is an enlarged perspective view of a bearing according to the invention.
Figure 3:
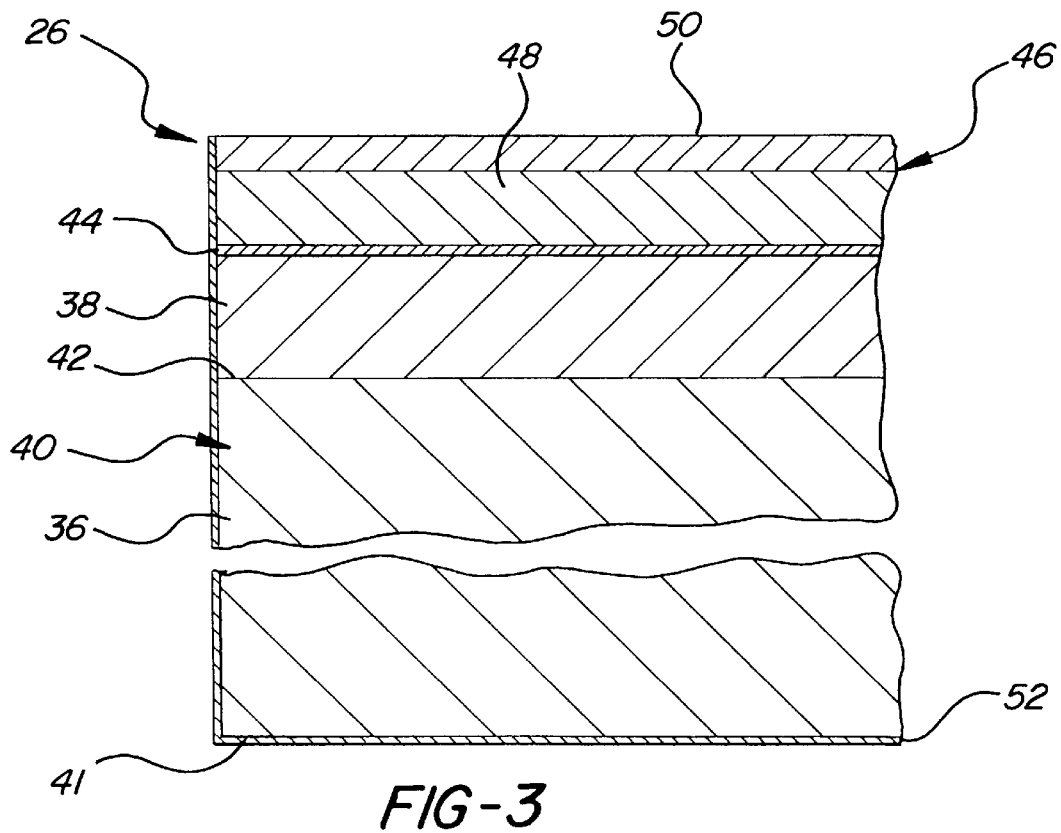
FIG. 3 is a fragmentary sectional view taken generally along line 3—3 of FIG. 2.

With reference to FIGS. 2 and 3, the bearing 26 of the invention includes a rigid metal support backing 36 and a liner 38 of metallic bearing material formed on the backing to collectively provide a base lining member 40 which forms the foundation of the bearing 26. The backing 36 preferably comprises an arcuate, semi-circular strip of steel and includes a convex outer surface 41 adapted for seating in a mating concave support structure and an opposite concave inner surface 42. The liner 38 may be formed of either a copper-lead or aluminum alloy of conventional compositions, which may be cast or otherwise formed on the inner surface 42 of the backing 36 according to well known practice. The base lining member 40 may also include a thin barrier layer or film 44 (i.e., about 1–2 μm thick) of either nickel or copper which may be electroplated onto the liner 38 accordingly to conventional practice to serve as a migration barrier or as a bonding layer for the overplate to be described below.

The construction described thus far with respect to the base lining member 40 is conventional. Where the invention departs from conventional practice is that following the fabrication of the base lining member 40, a multilayer overplate 46 is formed on the base lining member 40 having a combined thickness of about 15 μm. In contrast, the overplate of a conventional high load engine bearing is typically formed of a single layer of lead-tin-copper alloy having a thickness of about 25 μm.

As shown best in FIG. 3, the multilayer overplate 46 of the invention includes an underlayer 48 of lead-tin-copper and an overlayer 50 of tin. The underlayer 48 is preferably fabricated of the same lead-tin-copper alloy material as that used for conventional single layer overplates, but having a reduced thickness of about 10 um. The underlayer 48 may be electrodeposited onto the layer 44 according to conventional practice. A preferred composition of the lead-tin-copper underlayer 48, expressed in weight percentage, includes 10% tin, 2% copper and the balance lead, although other lead-tin-copper alloys commonly used in overlay bearing applications may be used having tin typically ranging from about 8–16% wt. and copper typically ranging from 0–10% wt., with the balance lead.

The overlayer 50 of tin is preferably pure tin electrodeposited onto the underlayer 46 to a thickness of about 5 μm to yield the combined overplate thickness of about 15 μm. The tin overlayer 50 may be formed using conventional tin plating equipment. It is preferred that the tin overlayer 50 be plated from a tin fluoborate electrolyte plating solution at a current density exceeding 20 amps/ft$^2$, and preferably exceeding about 50 amps/ft$^2$. Results consistent with those shown in the graph of FIG. 4 with respect to the bearings 26 of the invention were achieved by plating the tin overlayer 50 from a tin fluoborate electrolyte plating bath at current density of about 75 amps/ft$^2$.

According to a method of fabricating a multilayer bearing 26 of the invention, the base lining member 40 is prepared according to conventional practice by bonding the metallic liner 38 to the inner surface 42 of the backing 36 and then plating the liner 38 with the barrier layer 44 in preparation to receive the multilayer overplate 46. The overplate 46 is applied by first electrodepositing the lead-tin-copper underlayer onto the barrier layer 44 to a thickness of about 10 μm and then electrodepositing the tin overlayer 50 onto the underlayer 48 to a thickness of about 5 μm. As a final step, the bearing surface 41 is coated with a thin layer of tin flash plating 52 having a thickness of about 1 μm or less. Lead-tin flash plating may also be used. The flash plating 52 covers the exposed outer surface 41 and sides of the steel backing 36 in order to protect the backing 36 from corrosion and gives the bearing 26 a bright, attractive appearance that is advantageously uniform in appearance with the tin overlayer 50 of the invention.

Figure 4:
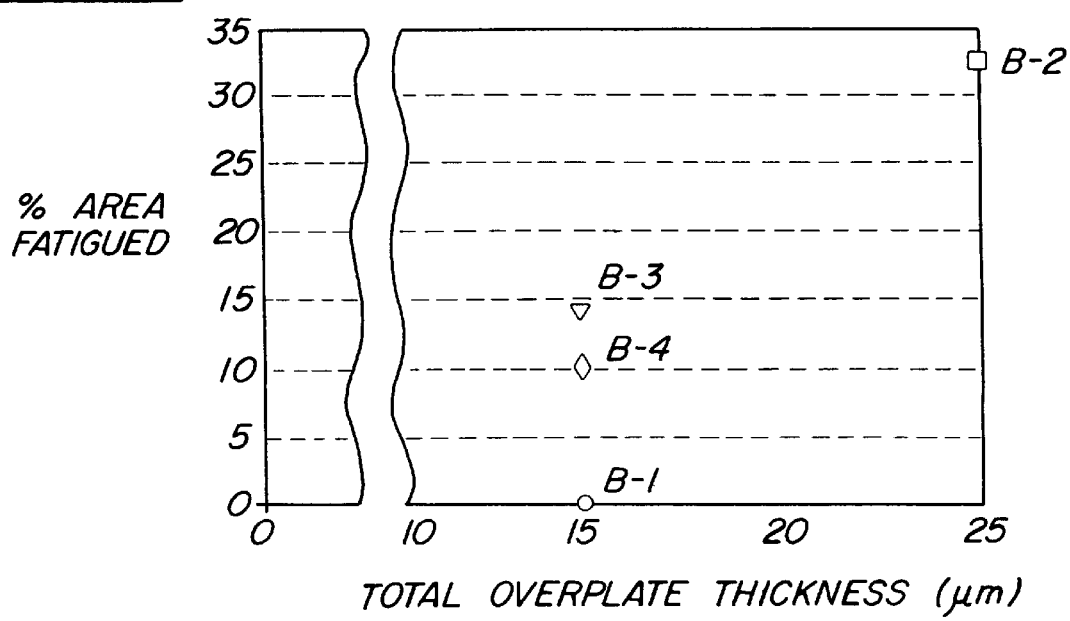
FIG. 4 is a graph showing fatigue performance as a function of overplate thickness for bearings having different overplates.

Bearings 26 manufactured according to of the invention were tested under conditions representative of extreme high dynamic loading service environment in an engine application. Other bearings were tested under the same conditions for comparison purposes and the results are shown in FIG. 4. Each of the bearings had the same base lining construction and differed only by the composition and thicknesses of their overplate layers. B-1 represents the bearings 26 of the invention having the 15 μm multilayer overplate 46. B-2 represents conventional engine bearings having a 25 μm thick single layer overplate of a conventional lead-tin-copper alloy (i.e., PbSn$_{10}$Cu$_2$). B-3 represents an engine bearing like that of B-2 but prepared with only a 15 μm overplate layer. Finally, B-4 represents an engine bearing having a 15 μm thick overplate of pure tin.

The test apparatus employed was a heavy duty diesel engine (i.e., 7.2 Liter I6 275 HP) representative of that shown at 10 in FIG. 1 coupled to a dynamometer. The bearings tested were connecting rod bearings and each were installed in the engine in conventional manner between the connecting rods and the crankshaft. The engine was operated under conditions applying about 70 Mpa unit load on the bearings (68.6 Mpa actual). The duration of each test was about 75 hours which equates to about 4.95×10$^6$ load cycles on the bearings.

It will be seen from the results given in FIG. 4 that the B-1 bearings of the invention clearly out performed the conventional B-2 bearings. Upon close visual inspection following testing, the bearing surface of the B-1 bearings showed no visible signs of fatigue cracking, whereas about 30% of the bearing surface area of the B-2 bearings showed fatigue cracking.

For purposes of comparison, B-3 bearings were prepared and tested and showed some improvement in fatigue performance in the B-3 bearings (about 15% area fatigued) as expected on account of the decrease in the overplate thickness to 15 μm from 25 μm. Surprisingly, however, the multilayer overplate of the B-1 bearings having the same 15 μm overplate thickness far out performed even the B-3 bearings, demonstrating that the results achieved by the B-1 bearings accounts for more than just overplate thickness.

The B-4 bearings were also prepared and tested for purposes of comparison with the results of the B1 bearings and, similarly to B-3, exhibited fatigue cracking (about 10% area fatigued) far in excess of the multilayer overplate 46 of the B-1 bearings of the same thickness. The results thus show that the fatigue-free performance of the B-1 bearings of the invention is attributed to the particular combination of the overplate materials used and their relative thickness.

Also surprising was to find that the remarkable improvements achieved in the fatigue resistance of the B-1 bearings of the invention were achieved without sacrificing other important properties of engine bearings, namely conformability, embedibility, wear resistance and seizure resistance. All properties were found to be within acceptable limits, including conformability and embedibility.

The invention has been described in an illustrative manner with regard to particular embodiments, and it is to be understood that the terminology which has been used is intended to be in the nature of words of description rather than of limitation. For example, it will be appreciated that the thickness expressed for the layers 48, 50 of the multilayer overplate 46 are to be considered nominal or average thicknesses within normal manufacturing limitations, and that in some cases the overplate 46 may be thicker in some regions of the bearing 46 and thinner in others. Accordingly, it is to be understood that multilayer overplates that may be somewhat thicker or thinner than 15 μm, and lead-tin-copper underlayers 48 and tin overlayers 50 that likewise may be somewhat thicker or thinner than 10 μm and 5 μm, respectively, and yet achieve the same or similar results are contemplated within the scope and spirit of the invention as equivalent structures.

Obviously, many modifications and variations of the present invention are possible in light of the above teachings. It is, therefore, to be understood that within the scope of the appended claims wherein parenthetical reference numerals are merely for convenience and are not in any way to be limiting, the invention may be practiced as otherwise than as specifically described.

What is claimed is:

1. A multilayer plain bearing comprising:
   a base lining member (40) including a rigid metal backing (36) and a liner (38) of bearing metal formed on said backing (36); and
   characterized by a multilayer overplate (46) formed on said base lining member (40) including an underlayer (48) of lead-tin-copper alloy having a predetermined thickness of about 10 μm and a functional overlayer (50) of tin having a predetermined thickness of about 5 μm.

2. The bearing of claim 1 further characterized by said tin overlayer (50) comprising essentially pure tin.

3. The bearing of claim 2 further characterized by said tin overlayer (50) comprising an electrodeposited tin layer (50) plated from a fluoborate electrolyte solution at a current density greater than about 20 amps/ft$^2$.

4. The bearing of claim 2 further characterized by said tin overlayer (50) comprising an electrodeposited tin layer (50) plated from a fluoborate electrolyte solution at a current density of about 75 amps/ft$^2$.

5. The bearing of claim 1 further characterized by said lead-tin-copper alloy of said underlayer (48) having about 8–16% by wt. tin, 0–10% by wt. copper, and the balance lead.

6. The bearing of claim 1 further characterized by said lead-tin-copper alloy of said underlayer (48) having about 10% by wt. tin, 2% by wt. copper, and the balance lead.

7. The bearing of claim 1 further characterized by said liner (38) comprising a material selected from a group of materials consisting essentially of copper-lead, and aluminum alloys.

8. The bearing of claim 1 further characterized by said base lining member (36) including a metallic layer (44) interposed between said liner (38) and said overplate (46).

9. The bearing of claim 8 further characterized by said metallic layer (44) comprising a material selected from a group consisting essentially of nickel and copper.

10. The bearing of claim 1 further characterized by including a flash plating (52) having a predetermined thickness substantially less than that of said overlayer (50) applied to at least said backing (36) of said bearing.

11. A multilayer plain engine bearing comprising:
    a base lining member (40) including a steel backing (36), a liner (38) of copper-lead bearing metal formed on said backing (36), and a diffusion barrier layer (44) of nickel formed on said liner (38); and
    characterized by a multilayer overplate (46) applied to said barrier diffusion layer (44) including an underlayer (48) of lead-tin-copper alloy having a predetermined thickness of about 10 μm and an overlayer 50 of tin having a predetermined thickness of about 5 μm.

12. An internal combustion engine assembly comprising:
    at least one rotatable component (24);
    at least one plain bearing (26) journaling said rotatable component (24), said bearing (26) including a base lining member (40) having a rigid metal backing (36) and a liner (38) of bearing material formed on said backing (36); and
    characterized by a multilayer overplate (46) formed on said base lining member (40) including an underlayer (48) of a lead-tin-copper alloy having a predetermined thickness of about 10 μm and an overlayer (50) of tin having a predetermined thickness of about 5 μm.

* * * * *